2,919,251
REGENERATION OF SPENT CONTACT CLAY

Frank R. Shuman, Jr., Chester Springs, Pa., assignor to Sun Oil Company, Philadelphia, Pa., a corporation of New Jersey No Drawing. Application December 12, 1955
Serial No. 552,268

2 Claims. (Cl. 252—414)

This invention relates to hydrogenating spent adsorptive contact clay containing adsorbed organic material.

In petroleum refinery operation, large quantities of adsorptive clays or earths are used in the refining of petroleum hydrocarbon fractions such as lubricating oil and wax fractions. The adsorptive clays are used, for example, in contact filtration and percolation treatments to decolorize and deodorize petroleum fractions. During use in hydrocarbon refining, the adsorptive clays gradually lose their activity for producing the desired refining effect until finally the activity decreases to such a point that it is no longer economical to use the adsorptive clay in further refining operations. Adsorptive clays or earths which have too low activity to be economically further used are termed "spent clays." Spent clays, which may contain up to about 30% by weight adsorbed organic material, are normally discarded as waste products of petroleum refining. Various methods have been devised for reclaiming spent clays but these methods have not proved satisfactory.

Now, in accordance with the present invention, the activity of spent clay is at least partially restored and valuable hydrocarbons can be recovered from the clay. In this invention, spent adsorptive clay containing adsorbed organic material is hydrogenated; that is, the spent clay is contacted with hydrogen at elevated temperatures and pressures. The hydrogenation restores at least partially the decolorizing and deodorizing activity of the spent clay, and the clay can be re-used in petroleum refining directly after the hydrogenation. However, in preferred practice of the invention, after hydrogenation the clay is first contacted with an organic solvent to extract valuable hydrocarbons from the clay prior to re-using the clay in petroleum refining operations. The hydrocarbons which are extracted from the hydrogenated clay are more highly aromatic than are hydrocarbons which are recoverable from spent clay prior to hydrogenation.

The hydrogenation of the spent clay can be performed in accordance with slurry, fixed bed, fluidized solid, or other known hydrogenation techniques. In slurry hydrogenation, the spent clay is admixed with a hydrocarbon or mixture of hydrocarbons, preferably saturate hydrocarbons, and the resulting slurry is subjected to elevated conditions of temperature and pressure under an atmosphere of hydrogen. In fixed bed operation, hydrogen is passed through a bed of spent clay which is contained between fixed supports in a suitable chamber at elevated temperature and pressure. In fluidized solid procedures, the spent clay is carried through a reactor in suspension in hydrogen at elevated temperature and pressure conditions. Fluidized solid techniques are preferred in carrying out this invention since a finer control of hydrogenation conditions can be obtained with such techniques.

The temperatures at which the spent clay hydrogenation is performed are in the range of about 500° F. to 1500° F., and preferably from 600° F. to 1000° F. Generally where maximum revivification of the clay is desired, higher temperatures, e.g. 750° F. to 1500° F. and preferably 750° F. to 1000° F. are employed. Where maximum recovery of valuable hydrocarbons of increased aromaticity is desired, intermediate temperatures in the range of about 600° F. to 750° F. are preferred. Where both maximum clay revivification and maximum hydrocarbon recovery is desired, successive hydrogenations at different conditions can be employed. The spent clay can first be hydrogenated at temperatures favoring maximum hydrocarbon recovery, e.g. 600° F. to 750° F. After recovery of the hydrocarbons by solvent extraction, the clay can again be hydrogenated, this time at more severe temperatures, e.g. 750° F. to 1000° F., which favor maximum clay revivification.

Pressures of from about atmospheric to 2000 p.s.i.g. (pounds per square inch gauge) can be employed in practicing the present invention. It is preferred to use somewhat higher pressures, e.g. 500 to 2000 p.s.i.g.

Clays which can be treated in accordance with the invention are substantially all adsorptive clays or earths which are normally used to refine mineral oil fractions; examples of such clays are fuller's earth, acid activated bentonites, and the like. Specific examples of commercially known clays are Attapulgus clays, Special Filtrol, Super Filtrol and the like.

The adsorptive clays are used to refine mineral oil fractions until the activity of the clay falls to an uneconomically low level. Then the clays containing adsorbed organic material are hydrogenated as above described. During hydrogenation, the clay acts as a catalyst to promote hydrogenation of adsorbed organic material to valuable hydrocarbons. After hydrogenation, the clay can be directly re-used in petroleum refining operations. Preferably, however, the clay is first contacted with a hydrocarbon solvent to extract valuable hydrocarbons from the clay. The solvent is preferably a low boiling saturate hydrocarbon such as pentane or a mixture of hydrocarbons such as petroleum ether. If desired, aromatic hydrocarbons such as benzene can be used alone or in admixture with saturate hydrocarbons. Polar solvents such as alcohol, ethers and the like can also be used. Valuable hydrocarbons are recovered after stripping off the solvent. These hydrocarbons have a higher aromatic content than hydrocarbons which can be extracted from the spent clay prior to hydrogenation. The clay is then re-used in the refining of mineral oil fractions, e.g. in the decolorization of lubricating oils.

The following example illustrates the invention:

An acid activated bentonitic clay was used to decolorize lubricating oil fractions until the clay had substantially completely lost its decolorizing activity.

The clay was Soxhlet-extracted with pentane, and oil comprising 6.4% by weight of the spent clay was recovered. After this solvent treatment, the clay was divided up into several portions; these portions were placed in bombs under hydrogen atmospheres and subjected to different conditions of elevated temperature and pressure. After hydrogenation, the clays were again contacted with pentane and varying amounts of oil were extracted from the clay portions. The following table summarizes the results obtained:

Table I

| Run | Conditions of Hydrogenation | | Oil Extracted from Clay with Pentane—Weight Percent of Clay | | |
|---|---|---|---|---|---|
| | Temperature, °F. | Pressure, p.s.i.g. | Before Hydrogenation | After Hydrogenation | Total |
| 1 | 550 | 1,300 | 6.4 | 5.3 | 11.7 |
| 2 | 650 | 1,000–1,800 | 6.4 | 13.4 | 19.8 |
| 3 | 790 | 1,400 | 6.4 | 6.5 | 12.9 |
| 4 | 900 | 1,400 | 6.4 | 2.5 | 8.9 |

From this table it can be seen that the hydrogenation resulted in increased recovery of extractable oil from the clay. The recovery was highest at about 650° F. hydrogenation temperature and lower at higher and lower hydrogenation temperatures.

The oil fractions extracted by pentane in run 2 both before and after hydrogenation were analyzed. The following table shows the results obtained:

Table II

|  | Extracted Before Hydrogenation | Extracted After Hydrogenation |
|---|---|---|
| Weight Percent C | 85.76 | 86.76 |
| Weight Percent H | 13.44 | 12.91 |
| Weight Percent N | 0.02 | 0.05 |
| Weight Percent S | 0.09 | 0.05 |
| R.I.$_{20°C}$ | 1.4865 | 1.4885 |
| U. V. Absorption Extinction Coefficient: Wave Length (millimicrons)— | | |
| 240 | 3.50 | 7.86 |
| 250 | 1.74 | 4.09 |
| 260 | 1.88 | 4.75 |
| 270 | 1.68 | 4.00 |
| 280 | 1.36 | 3.25 |
| 290 | 1.06 | 2.53 |

The above results indicate that the oil extracted from the spent clay both before and after hydrogenation is primarily composed of hydrocarbons. The oil extracted after the hydrogenation has a substantially higher aromaticity as shown by the higher refractive index and higher ultraviolet light absorption.

The revivified clay portions, after hydrogenation and washing with pentane as shown in Table I, were used to decolorize a mineral lubricating oil. Revivified clay dosage in amount of 10 lbs. of clay per barrel of oil was used with a contact time of 20 minutes at 250° F. Comparative runs were made with spent clay which had been solvent extracted but not hydrogenated, and with fresh clay. The following table summarizes the results obtained:

Table III

|  | Conditions of Hydrogenation | | Color of Clay-contacted Oil | |
|---|---|---|---|---|
|  | Temperature, °F. | Pressure, p.s.i.g. | NPA | O.D. |
| Spent clay not hydrogenated | | | 4¼ | 65.9 |
| Run 1 | 550 | 1,300 | 4¼ | 59.5 |
| Run 2 | 650 | 1,000–1,800 | 4 | 56.1 |
| Run 3 | 790 | 1,400 | 4 | 52.0 |
| Run 4 | 900 | 1,400 | 3¾ | 42.0 |
| Fresh clay | | | 3¼ | 27.9 |

These results show that in all cases the hydrogenated spent clay had a greater decolorizing activity than non-hydrogenated spent clay. The revivification of the decolorizing activity of the spent clay increased with increasing hydrogenation temperature. Clay which was hydrogenated at 900° F. (run 4) had about 63% of its decolorizing activity restored by the treatment of this invention.

In an especially preferred practice of this invention, spent clay is subjected to successive hydrogenations at different conditions whereby both maximum oil recovery and maximum clay revivification are obtained. In this practice of the invention, the spent clay is first subjected to hydrogenation at lower temperatures, e.g. in the range of about 600° F. to 750° F., and pressures of 500 to 2000 p.s.i.g. After this hydrogenation, oil is extracted from the clay with an organic solvent. The clay is then hydrogenated at more severe conditions, e.g. at temperatures of 750° F. to 1000° F. and pressures of 500 to 2000 p.s.i.g. After this second hydrogenation, the clay is again contacted with solvent to remove oil, and the clay is then re-used in petroleum refining procedures. Alternatively, this latter solvent extraction is omitted and the clay is directly re-used in petroleum refining procedures after the second hydrogenation. This preferred practice of the invention results in high recovery of oil from the spent clay as well as high clay revivification.

The invention claimed is:

1. Method of revivifying spent adsorptive contact clay spent in decolorizing and deodorizing a petroleum fraction and consisting essentially of adsorptive contact clay and adsorbed organic material resulting from such decolorizing and deodorizing, said method comprising: hydrogenating said spent clay at temperatures in the range of from 500° F. to 750° F. and pressures in the range of 500 p.s.i.g. to 2000 p.s.i.g., extracting oil from the hydrogenated spent clay with an organic solvent, and again hydrogenating said spent clay at temperatures in the range of 750° F. to 1000° F. and pressures in the range of 500 p.s.i.g. and 2000 p.s.i.g.

2. Method according to claim 1 wherein the first hydrogenation step is conducted at a temperature of approximately 650° F.

References Cited in the file of this patent

UNITED STATES PATENTS

| 2,238,726 | Feisst et al. | Apr. 15, 1941 |
| 2,367,474 | Stewart | Jan. 16, 1945 |
| 2,472,844 | Munday et al. | June 14, 1949 |
| 2,487,867 | Griffin | Nov. 15, 1949 |
| 2,703,308 | Oblad et al. | Mar. 1, 1955 |